(12) United States Patent
Mohr et al.

(10) Patent No.: US 10,969,771 B2
(45) Date of Patent: Apr. 6, 2021

(54) COMPUTED TOMOGRAPHY FOR NON-DESTRUCTIVE EVALUATION OF MANUFACTURED PARTS

(71) Applicant: EDISON WELDING INSTITUTE, INC., Columbus, OH (US)

(72) Inventors: Luke Mohr, Buffalo, NY (US); Yu Hsuan Lee, Buffalo, NY (US); Nozomu Okuda, Lockport, NY (US); Alex Kitt, Buffalo, NY (US)

( * ) Notice: Subject to any disclaimer, the term of this patent is extended or adjusted under 35 U.S.C. 154(b) by 56 days.

(21) Appl. No.: 16/438,619

(22) Filed: Jun. 12, 2019

(65) Prior Publication Data

US 2020/0393823 A1    Dec. 17, 2020

(51) Int. Cl.
*G05B 19/418* (2006.01)
*G01N 23/046* (2018.01)

(52) U.S. Cl.
CPC ..... *G05B 19/41875* (2013.01); *G01N 23/046* (2013.01); *G01N 2223/426* (2013.01); *G05B 2219/32368* (2013.01); *G05B 2219/35012* (2013.01); *G05B 2219/37569* (2013.01)

(58) Field of Classification Search
None
See application file for complete search history.

(56) References Cited

U.S. PATENT DOCUMENTS 6,002,739 A * 12/1999 Heumann ............. G06T 11/006
378/21
2005/0078861 A1* 4/2005 Usikov ................. G06T 11/006
382/131

* cited by examiner

*Primary Examiner* — Carlos R Ortiz Rodriguez

(57) ABSTRACT

A method for using computed tomography for non-destructive evaluation of a part, comprising: providing a computed tomography system; loading predetermined computed tomography system setup information; customizing settings with predetermined algorithmic parameters and functions depending on part features; processing projection counts; processing prior knowledge data relevant to the part; creating masking data from the customized settings; pre-processing reconstruction results based on the customized settings; performing algorithmic adjustments based on prior knowledge data and part geometry; performing algorithm adjustments during iterations; and post-processing reconstruction results.

16 Claims, 5 Drawing Sheets

COMPUTED TOMOGRAPHY FOR NON-DESTRUCTIVE EVALUATION OF MANUFACTURED PARTS

BACKGROUND

The present invention relates in general to systems, devices, and methods for non-destructive evaluation of manufactured components and parts and more specifically to systems and methods for using computed tomography for nondestructive evaluation of components and parts made by additive manufacturing systems, devices, and processes. This invention further includes a system and method for reconstructing tomographic images and particularly to an iterative process for performing the reconstruction.

Additive manufacturing continues to expand into numerous industries and applications in which component or part qualification is a vital consideration. Nondestructive evaluation of additive manufacturing parts may be used for quality control and quality assurance purposes regarding such items; however, traditional nondestructive evaluation systems and methods may not be adequate or suitable for use with additive manufacturing parts having complex external or internal geometries. The use of computed tomography for nondestructive evaluation provides an attractive option for additive manufacturing part inspection because it allows for the detection of internal defects occurring within very complex geometries. However, time and cost restrictions have typically limited the feasibility of computed tomography as a full-scale inspection solution. Accordingly, there is an ongoing need for systems and processes for utilizing computed tomography for nondestructive evaluation of additive manufacturing.

SUMMARY

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

As previously stated, time and cost restrictions limit the feasibility of computed tomography as a full-scale inspection solution. The present invention provides a system and method that produces high-quality reconstructions using a fraction of the scan images required by traditional algorithms. Depending on part geometry, a 3x to 10x faster CT scan time has been demonstrated and this data represents the potential to greatly reduce the cost of inspection and qualification with CT. The time spent creating three-dimensional reconstructions from CT images can be divided into two categories: (i) scan time and (ii) computation time. Scan time is the time spent by the CT system capturing X-ray projection images, while computation time is the time spent algorithmically reconstructing a three-dimensional model using the projection images as an input. The industry-standard Feldkamp-Davis-Kress (FDK) algorithm requires a large number of evenly spaced projection images to create an accurate three-dimensional reconstruction, necessitating a lengthy scan time to collect this information. The CT methodology of the present invention reduces scan time by integrating prior knowledge data with fewer scan images during three-dimensional reconstruction. Importantly, this methodology is software-based and is executed during computation time, meaning that this method is hardware agnostic and has the potential to be implemented in any existing setup. The methodology of this invention is based on the algebraic reconstruction technique (ART) developed by Gordon, Bender, and Herman. The main advantage of this iterative technique over the FDK algorithm is the ability to integrate a priori information into the algorithm at any point prior to or during reconstruction. By utilizing information known about a part prior to manufacturing, reconstruction quality similar to that of traditional methodologies can be maintained while reducing the required number of scan images.

In accordance with one aspect of the present invention, a method for using computed tomography for non-destructive evaluation of a manufactured part is provided. This method includes loading predetermined computed tomography system setup information on a computed tomography system; customizing settings with predetermined algorithmic parameters and functions depending on part features; processing projection counts; processing prior knowledge data relevant to the part; creating masking data from the customized settings; pre-processing reconstruction results based on the customized settings; performing algorithmic adjustments based on prior knowledge data and part geometry; performing algorithm adjustments during iterations; and post-processing reconstruction results.

In accordance with another aspect of the present invention, a first method for using computed tomography for non-destructive evaluation of a part by reconstructing a volume from X-ray projections gathered from a tomographic system using limited information is provided. This method includes collecting measured projection data from a tomographic system using system hardware information including geometric configuration and scanning parameters; processing projection images and count data; processing and aligning prior knowledge data; generating a sinogram mask of the projection data from the prior knowledge data; generating a reconstruction mask in three-dimensional volume grid space from the prior knowledge data; generating an initial three-dimensional relaxation matrix from the prior knowledge data; cropping projection data, prior knowledge data, sinogram and reconstruction mask data, and relaxation matrix data based on part and scanning geometry for reconstruction computation speed improvement; generating an estimate reconstruction based on the input masked projection data and populating a masked reconstruction space; forward projecting the estimate reconstruction and calculating the difference between the measured projection data and the estimated projection data; back projecting the differences over the reconstruction volume; weighting the back projected differences with the relaxation matrix and then combining the information with the estimate reconstruction and updating the estimate reconstruction; combining a set number of previous back projected differences to function as a heatmap for features not aligned or able to be aligned by the prior knowledge data; updating the relaxation matrix as a function of an accelerating or decelerating parameter based on the current iteration of the process and the calculated heatmap; repeating the appropriate previous steps until a convergence criterion is met; post-processing the reconstruction results by applying a smaller reconstruction mask than that generated previously; and outputting the reconstructed tomographic image.

In yet another aspect of this invention, a second method for using computed tomography for non-destructive evaluation of a part by reconstructing a volume from X-ray projections gathered from a tomographic system using limited information is provided. This method includes collecting measured projection data from a tomographic system using system hardware information including geometric configuration and scanning parameters; processing projection images and count data based on part geometry information including dimensions and material composition; processing and aligning prior knowledge data, wherein the prior knowledge data includes three-dimensional CAD data, other reconstruction data derived from the same part, and part geometry information including dimensions and material composition; generating a sinogram mask of the projection data from the prior knowledge data; generating a reconstruction mask in three-dimensional volume grid space from the prior knowledge data; generating a three-dimensional relaxation matrix from the prior knowledge data; cropping projection data, prior knowledge data, sinogram and reconstruction mask data, and relaxation matrix data based on part and scanning geometry for reconstruction computation speed improvement; generating an estimate reconstruction based on the input masked projection data and populating a masked reconstruction space; forward projecting the estimate reconstruction and calculating the difference between the measured projection data and the estimated projection data; back-projecting the differences over the reconstruction volume according to an SIRT-like iterative process; weighting the back projected differences with the relaxation matrix and then combining the information with the estimate reconstruction, and updating the estimate reconstruction; combining a set number of previous back projected differences to function as a heatmap for features not aligned or able to be aligned by the prior knowledge data; updating the relaxation matrix as a function of an accelerating or decelerating parameter based on the current iteration of the process and the calculated heatmap; repeating the appropriate previous steps until a convergence criterion is met; post-processing the reconstruction results by applying a smaller reconstruction mask than that generated previously; and outputting the reconstructed tomographic image.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIGS. 6A-6C are images demonstrating the effectiveness of the present invention, wherein FIG. 6A is an image of a classical iterative reconstruction without prior knowledge data and 3× faster scan time; FIG. 6B is an image of CT reconstruction using prior knowledge data and 3× faster scan time (representing the output of the present invention); and FIG. 6C is an image of a traditional FDK reconstruction at full scan time.

DETAILED DESCRIPTION

Figure 1:
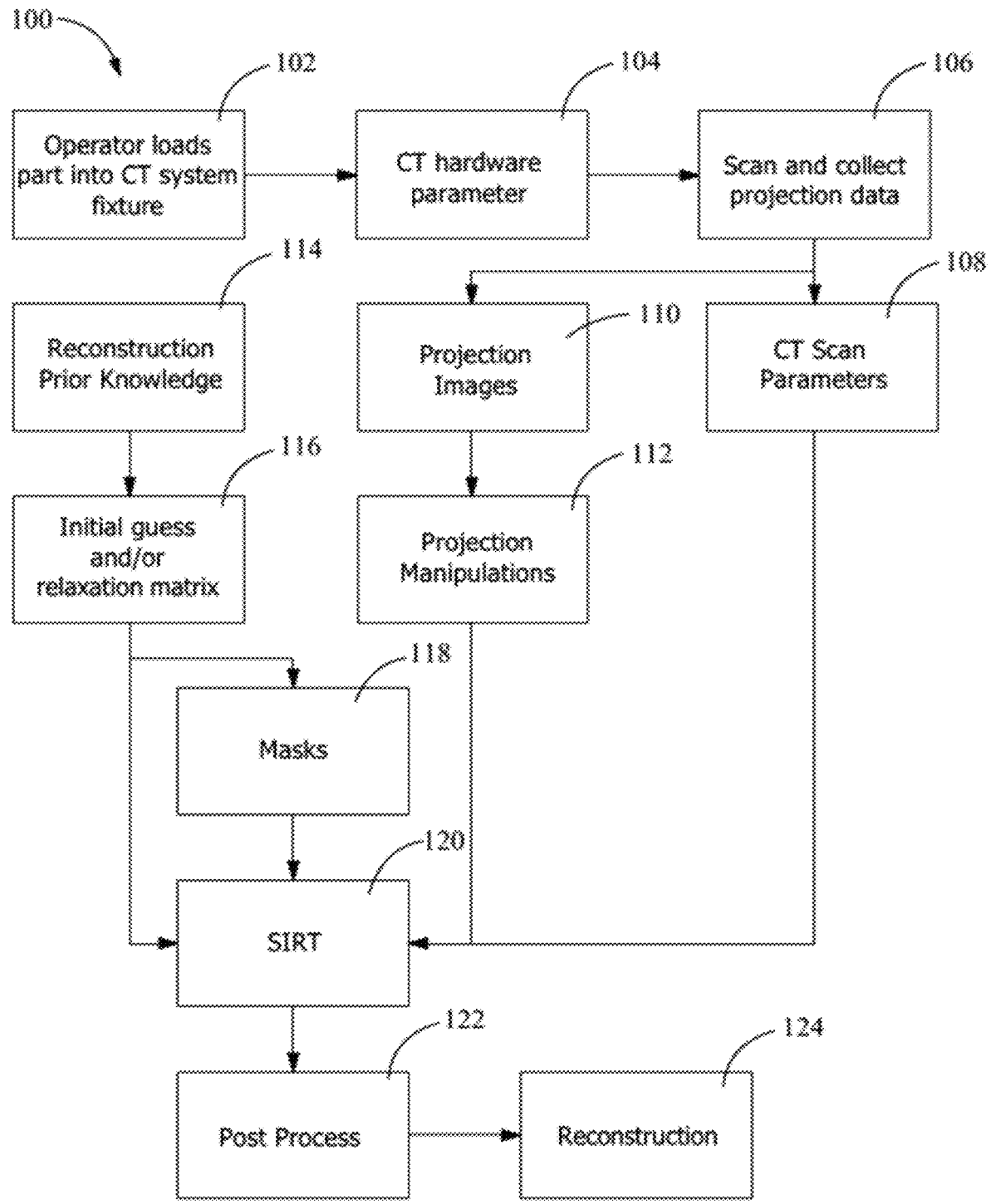
FIG. 1 is flowchart of a CT inspection and reconstruction method in accordance with an exemplary embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention provides systems and methods for using computed tomography for nondestructive evaluation of components and parts made by additive manufacturing processes. This invention further includes a system and method for reconstructing tomographic images and particularly to an iterative process for performing the reconstruction.

The conventional method for reconstructing computed tomography (CT) images, the Feldkamp, Davis, and Kress reconstruction algorithm (FDK), was originally developed for medical applications, particularly those involving imaging human body parts. The FDK reconstruction algorithm is not optimized for industrial CT, where the imaging challenges are different from medical CT in two distinct ways. First, in industrial CT, a priori information about a part being inspected is known from the inspection of similar parts or from design data relevant to the part. Similar information is not typically available for medical CT applications. Second, medical CT is primarily focused on inspecting carbon-based materials in the human body, while industrial CT deals with a very wide range of materials. The FDK reconstruction algorithm requires many projections, leading to long scan times on CT systems and resulting in high costs. Furthermore, the FDK reconstruction algorithm requires uniform sampling of a part and includes all data gathered, even low-signal-to-noise data points from particularly thick or dense x-ray paths. Lastly, the FDK reconstruction algorithm provides limited options for customization, thereby inhibiting easy inclusion of a priori information, such as that relevant to industrial applications.

The present invention is derived from the family of algebraic iterative techniques by Gordon, Bender, and Herman, based on Kaczmarz's method, which are fundamentally different from the basis of FDK. When algebraic reconstruction techniques were originally conceived, computational limitations prevented practical application of these algorithms. Because commercial computational capability has increased over time, algebraic reconstruction techniques are now more computationally feasible. This invention decreases the required scan time of industrial computed tomography systems while maintaining a similar or improved level of reconstruction quality. This is accomplished by including a priori information, thereby requiring less input projection data for reconstruction.

The CT reconstruction of this invention is accomplished through utilization of the Simultaneous Iterative Reconstruction Technique (SIRT) derived from the Algebraic Reconstruction Technique (ART). Each iteration is updated by means of the SIRT iteration formula, which appears below as Equation (1):

$$x^{(i+1)} = x^{(i)} + \lambda C A^T R (b - A x^{(i)}) \qquad (1)$$

wherein:
- x represents the vector of attenuation values at each reconstruction voxel. The entirety of x can be thought of as the reconstruction.
- b represents the vector of measured projection values at each detector pixel, for each angle.
- A represents the matrix representing the image process (i.e., how attenuation values in reconstruction space are projected to sinogram space). In the context of this invention, this specifically refers to cone-beam CT geometries. There is more than one way to construct A (with varying degrees of speed and accuracy), but here each entry in the matrix represents the length of a vector passing through a voxel that hits a given detector pixel. In particular, each row of the matrix corresponds to one detector pixel measured at a one angle (so each entry in a row is the length through a voxel of the ray passing from the source to that detector pixel). Conversely, each column of the matrix corresponds to one particular voxel.
- Ax represents the forward projection of reconstruction data into projection space.
- b-Ax represents the correction values. This is the difference between actual projection data and the forward projection of the "current guess" and is the basis for how the system updates to the next iteration.
- R represents the "line weights" and normalizes the difference b-Ax by dividing each entry of the projection difference data by the total length of the ray hitting the pixel detector corresponding to the entry.
- $A^T$ represents the transpose of A and performs back projection of the normalized projection difference data to reconstruction space.
- C represents the "pixel weights" and normalizes the back projected data by dividing each entry by the total length of rays passing through the voxel corresponding to that entry.
- λ represents the relaxation parameter and can be a scalar value or a matrix performing element wise multiplication. The relaxation parameter modifies the calculated update values.

This invention includes the following basic method steps: (i) load relevant CT system setup information; (ii) customize settings with appropriate algorithm parameters and functions depending on part features; (iii) process projection counts; (iv) process prior knowledge data; (v) create masking data from customized settings; (vi) pre-process reconstruction results based on customized settings; (vii) perform algorithm adjustments based on prior knowledge data and part geometry; (viii) perform algorithm adjustments during iterations; and (ix) post-process reconstruction results. An example of a commercially available CT system compatible with this invention is the Nikon XTH 225, although this invention may be used on any number of commercially available CT systems.

The flowchart of FIG. 1 provides a description of a reconstruction method in accordance with an exemplary embodiment of the present invention. In FIG. 1, reconstruction method 100 begins with an operator loading a part to be analyzed into a CT system fixture at step 102. A CT hardware parameter selection is made at step 104; projection data is scanned and collected at step 106; CT scan parameters are entered at step 108; projection images are collected at step 110; projection manipulations are made at step 112; gathering of prior knowledge data occurs at step 114; construction of the initial guess and/or relaxation matrix occurs at step 116; masks are applied at step 118; the SIRT algorithm is applied at step 120; post processing occurs at step 122; and the final reconstruction is output at step 124.

Figure 2:
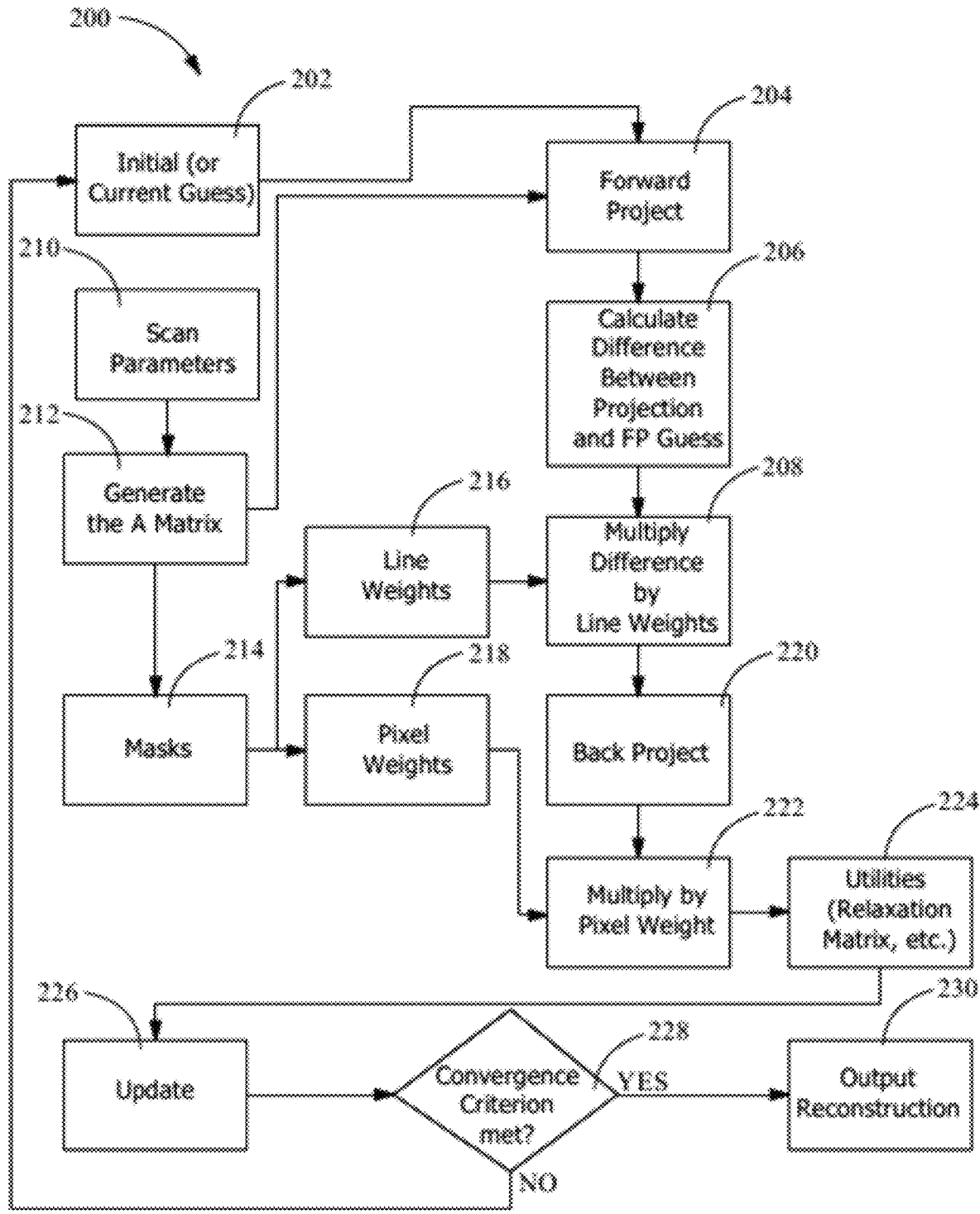
FIG. 2 is a flowchart of an iteration process in accordance with an exemplary embodiment of the present invention.

The flowchart of FIG. 2 provides a description of an iteration process in accordance with an exemplary embodiment of the present invention. In FIG. 2, iteration process 200 begins with an initial (or current) guess at step 202. The forward projection of the initial (or current) guess is calculated at step 204; the difference between the measured projection data and the forward-projected guess is calculated at step 206; multiplying the difference by line weights occurs at step 208; scan parameters are entered at step 210; the A matrix (referenced in Equation (1)) is generated at step 212; masks are applied at step 214; line weights are determined at step 216; pixel weights are determined at step 218; back projection occurs at step 220; multiplying by pixel weight occurs at step 222; utilities (relaxation matrix, etc.) are applied at step 224; the current guess is updated by the correction resulting from the previous step at step 226; a determination that convergence criterion have been met occurs at step 228; and the full reconstruction is output at step 230. Steps 202, 204, 206, 208, 220, 222, 224, and 226 comprise one iteration of the SIRT algorithm (i.e., one iteration of step 120 in FIG. 1). If a convergence criterion is not met in step 228, these steps are repeated until the criterion is met. The determination of values used in steps 210, 212, 214, 216, and 218 are done prior to the start of the iterative process but are used as inputs during the process itself.

I. Projection Data Manipulations

Thresholding

With reference to FIG. 1, projection manipulation (step 112) denotes the pre-processing of projection data (RT Images) gathered from the CT system. First, an optional thresholding step is applied to the data based on X-ray count values. Each pixel with a value lower than the specified pixel-threshold value is replaced with a default value. If the data contains count values lower than the specified image-threshold value, the entire projection is removed from consideration.

Beam Hardening Corrections

Secondly, the projection data is then adjusted to compensate for beam hardening by applying a mapping function. Based on pre-determined parameters, X-ray counts are converted to attenuation values.

II. Prior Knowledge Inclusion and Processing; Masks

Iterative reconstruction techniques provide the capability to include prior knowledge data, in different forms, as a method for improving the scanning process. The present invention takes advantage of this capability through sinogram masking, reconstruction masking, relaxation matrix creation, and initial reconstruction.

Sinogram Masking

Figure 3A:
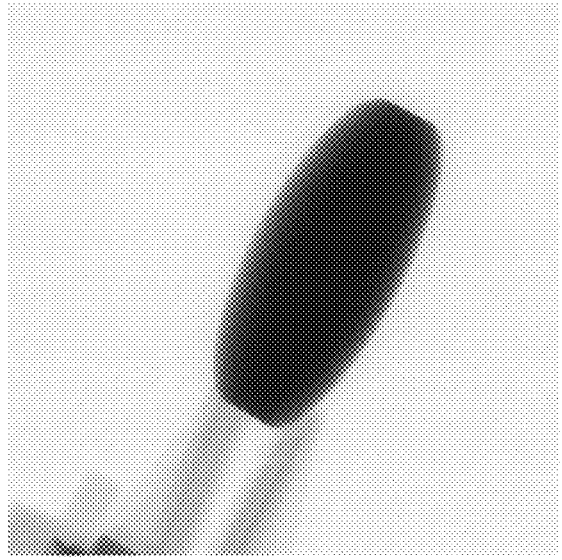
FIG. 3A is a puck projection and FIG. 3B is a watershed mask of the same puck projection.
Figure 3B:
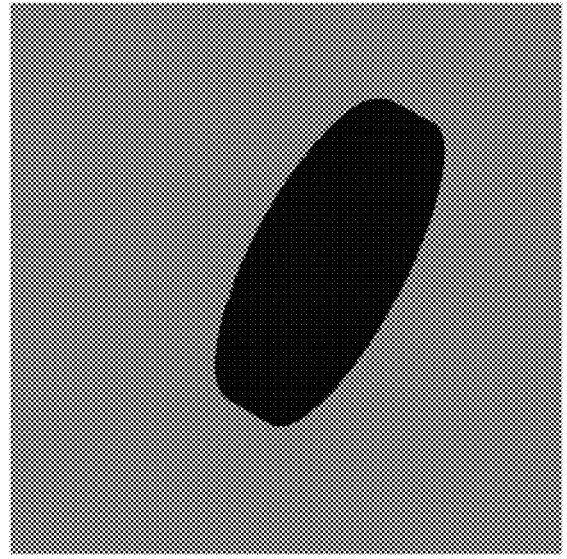

Masking of the projection data, by extension of the sinogram data, can be created from prior knowledge data of a component or part. This is particularly effective for high attenuation components that are difficult for the CT system to penetrate. If the CT system does not have higher energy capabilities, the high attenuation component can cause streaking and scattering artifacts, which decreases reconstruction quality. A sinogram mask can suppress these effects through masking the high attenuation component. Specifically, knowing the presence and location of high attenuation components inside scanned parts allows masking of the component from the projection data. This is accomplished through image processing techniques that combine thresholding methodologies (e.g., Otsu's method) with various segmentation techniques (e.g., Watershed transformation) in order to mask out the high attenuation component. The low count features (corresponding to high attenuation components) inside the projection data is identified through the thresholding and the segmenting technique removes this information from the projection (see FIGS. 3A-3B).

For more complex geometries, image processing techniques may have difficulty segmenting and masking the data based on counts. The sinogram mask can also be generated through a forward projection technique from the reconstruction mask. In this situation, the reconstruction mask (generated, for instance, as described in below) is multiplied by the geometry matrix A, to forward project into sinogram space. This forward projection permits the building of a sinogram mask over the corresponding regions in projection space.

Reconstruction Masking

With reference to Equation (1), x denotes the reconstruction space that is iteratively deblurred. The reconstruction space can be masked through inclusion of different prior knowledge data. This has the result of reducing the volume that is to be reconstructed over in the back-projection mechanism, increasing contrast and feature definition. The mask reduces the outside voxels to zero and removes them from consideration in the iterative process.

A reconstruction mask can be created from three-dimensional CAD data or a reconstruction of the scanned part using optimal scanning parameters. Three-dimensional CAD data (e.g. STL files) can be converted into binary images to provide a Boolean mask input and the reconstruction can be converted into binary images using readily available image processing techniques. Two mask options are available with segmented features providing multiple "islands" of masked data or the creation of a convex hull around the masked features thereby providing a singular island of masked data. To provide reasonable results in the reconstruction, the reconstruction mask is required to be aligned with the reconstruction of the to-be scanned part. This is possible through hard fixtures in the CT scanning stage, fixing the pose of the part, or through the use of readily available alignment techniques by aligning to the first few non-masked iterations of the reconstruction. Creation of the reconstruction mask also requires image processing. Achieving a tight or perfect fit of the reconstruction mask is known to be extremely difficult and does not provide beneficial results. A dilation step is typically necessary to increase the size of the masked volume. The number of voxels to dilate is a parameter that can be tuned based on the part being scanned.

Figure 4A:
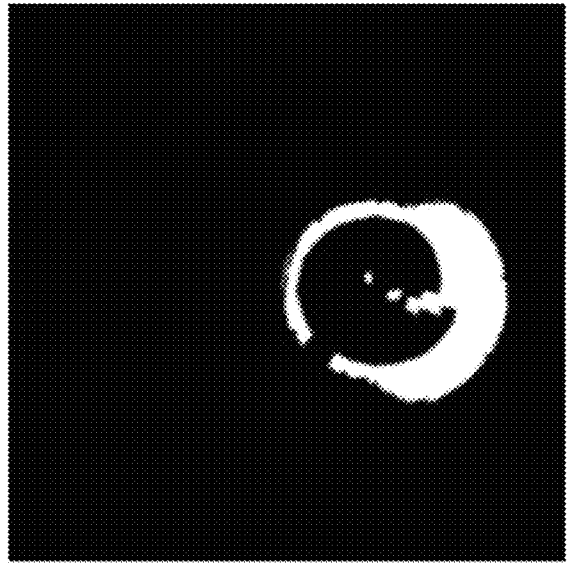
FIG. 4A is an image showing a slice of binarized and aligned initial CAD data of an additively manufactured rook (part) and FIG. 4B is a dilation reconstruction mask over the same slice using the CAD data as prior knowledge data.
Figure 4B:
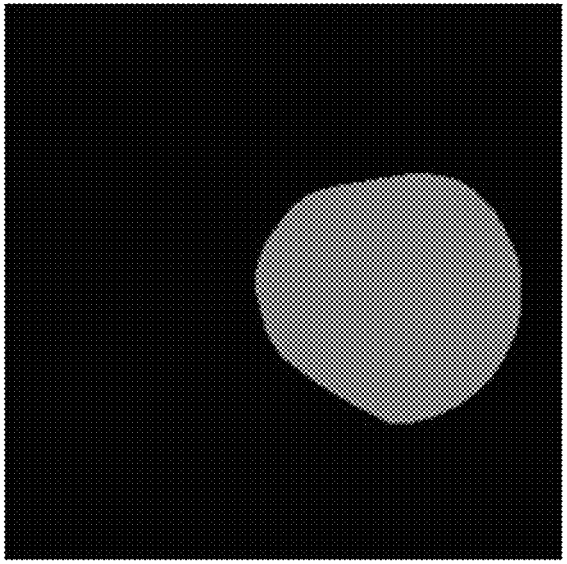
Figure 5:
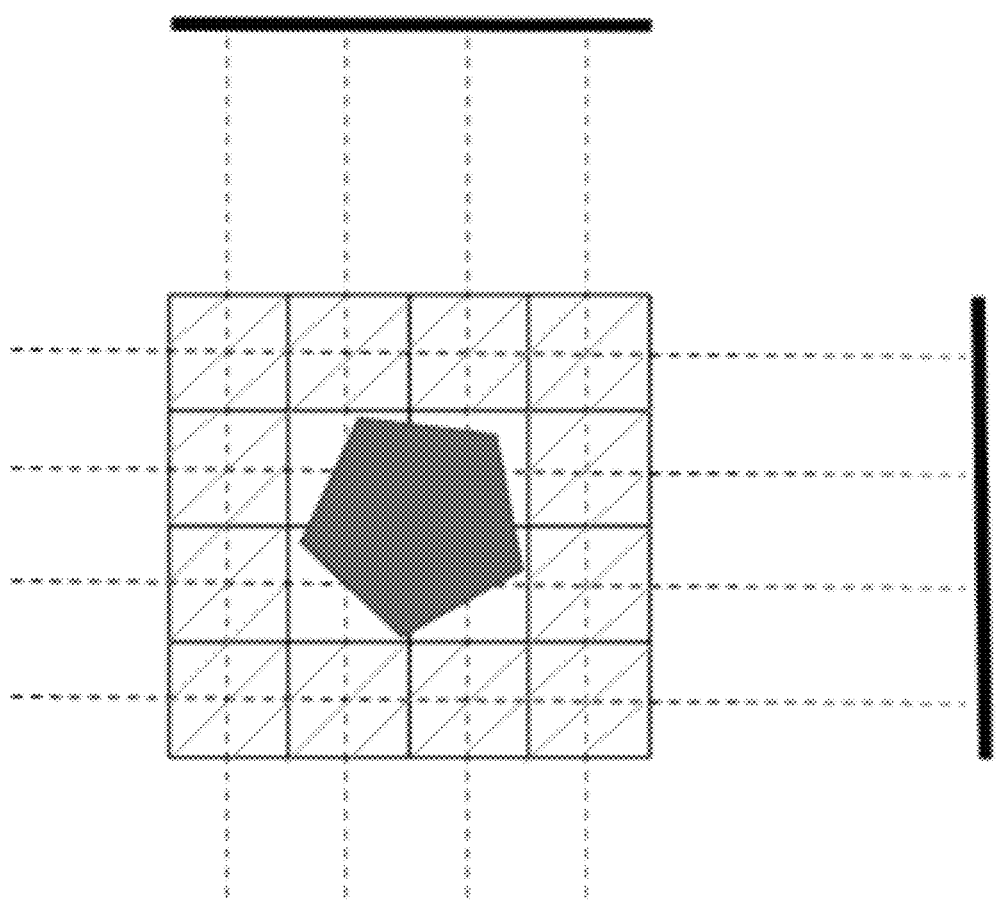
FIG. 5 is a graphic representing a reconstruction mask shown in reconstruction space, wherein the shaded regions represent voxels that would initially be set to 0 in the reconstruction mask because X-rays traveling through these voxels do not intersect the object being imaged.

An exemplary method for creating a reconstruction mask includes the following steps: (i) obtaining and processing prior knowledge data (CAD or optimal reconstruction data of a master part); (ii) converting to an array; (iii) completing binarization through common image processing and segmentation techniques; (iv) dilating using image morphology operations (see FIGS. 4A and 4B); and (v) injecting into reconstruction algorithm. FIG. 5 includes a graphic representing a reconstruction mask shown in reconstruction space.

Creation of Relaxation Matrix

The relaxation parameter is traditionally used as a scalar value to modify the update values to the current reconstruction iteration. In this invention, each reconstruction voxel will have an associated relaxation value. This represents a relaxation matrix that is the same size as the reconstruction volume and that will perform element-wise multiplication relaxation on that particular voxel for each iteration. The relaxation matrix can be constructed in a similar manner to the reconstruction mask. From an aligned prior knowledge data set (e.g., three-dimensional CAD data such as STL or a reconstruction from an idealized scan), an exemplary method for calculating the relaxation matrix uses Equation (2) below:

$$\lambda_{Relax} = x_{initial} - x_{update} \qquad (2)$$

The weights of the relaxation matrix can be recalculated every iteration (see FIG. 2). Initial results show that an acceleration factor above 1 will increase the speed of convergence and reduce the number of iterations needed for accurate reconstruction.

Initial Reconstruction

An initial starting reconstruction volume is created from prior knowledge data such as three-dimensional CAD data or another reconstruction of an identical part, in a similar manner to the reconstruction mask. This initial reconstruction provides a reconstruction "guess" which is closer to the final convergence product. Experimental results indicated that this approach leads to a faster, more accurate reconstruction of the scanned component.

III. Iteration Process

Relaxation Matrix

This invention modifies and adjusts the relaxation parameter as a function of the iteration count (see FIG. 2; Utilities 224). Various adjustment functions are available with a linear function being the default. The linear function begins with a high scaling factor which is multiplied throughout the relaxation matrix, increasing the update value multiplicatively. As the iteration count approaches the specified cutoff iteration count, the scaling factor decreases linearly until it reaches 1.0 when the cutoff iteration count is reached. Depending on the update values of each iteration, different adjustment functions for the modification of the relaxation matrix is possible, such as an exponential function.

Ideal Deviation with Delta Weight

Mass produced parts, though designed to be identical, will nevertheless feature some amount of variation. To account for this variation and for defects introduced during the manufacturing process, a weighting matrix is applied during the iterative update procedure. A master reference reconstruction of a "perfect" part is preloaded and used as an initial guess in the iterative procedure. This reference is also used to generate the weighting matrix by means of the following steps at the end of each iteration: (i) the "next guess" update for the reconstruction volume is generated for use in the next iteration; (ii) take the absolute difference between this update and the master reference reconstruction; (iii) linearly scale the differences to a range of [0,1], then optionally apply a scaling factor to accelerate convergence; (iv) the matrix constructed in the previous step is the weighting matrix, and is multiplied element-wise through the update matrix in the following iteration. The purpose of this weighting matrix is to emphasize portions of the current reconstruction that are misaligned with the master reference and deemphasize portions that are already aligned. This is designed to overcome the small update sizes inherent when using an initial guess and to accelerate identification of misalignments or defects.

As discussed below, Ideal Deviation with Delta Weight is a specific example of an iteration heatmap. These heatmaps are "integrated" with the relaxation matrix and provide a means for generating the relaxation matrix. Alternately, a heatmap may be combined with a previously generated relaxation matrix (e.g., additively, multiplicatively, or other appropriate operation.

Iteration Heatmap

Similar to the Ideal Deviation with Delta Weight, the update values for each iteration can provide information and regions of interest (ROIs) where high amounts of correction are being conducted. These update values can be collected across several iterations thereby representing a "heatmap" of corrections. This heatmap can be used to create a weighting matrix for accelerating the convergence of voxels with high correction values. Also, the heatmap can be used to identify ROIs with features that deviate significantly from the master reference.

IV. Production Environment

Alignment

The various steps executed by this invention (reconstruction mask, sinogram mask, initial, relaxation matrix, etc.) depend on accurate alignment of the prior knowledge data to the reconstruction of the scanned part. The pose of the reconstruction of the scanned part can be constrained through physical methods to decrease or eliminate the need for data alignment. In practice, CT systems allow hard fixturing of components for repeatable position in each scan. The parts will have datums for alignment in the fixtures. These fixtures would be made from low attenuation material to prevent corruption of the reconstruction results.

When small alignments are needed or CT hardware fixturing is not possible, common place alignment techniques can be employed, such as Iterative Closest Points. The prior knowledge data will align to a reconstruction using unaltered iterative reconstruction methods, without using steps (e.g., reconstruction mask, sinogram mask, initial, relaxation matrix, etc.). The resulting transformation matrix is then applied to the prior knowledge data for accurate alignment to the reconstruction of the scanned part. The reconstruction is then restarted using the aligned prior knowledge data, resuming the iteration shown in FIG. 2.

Computation Time

Iterative reconstruction methods typically involve uniform computation times for each iteration, with the convergence criterion met after a pre-determined number of iterations. Total computation time can be largely defined from the following equation (Equation (3)), excluding generic overhead tasks:

$$t_{total} = t_{pixel\ weights} + t_{line\ weights} + t_{masks} + t_{alignment} + n \cdot t_{iteration} \quad (3)$$

wherein:

$t_{pixel\ weights}$ represents the time required for calculating the pixel weights referenced in Equation (1).

$t_{line\ weights}$ represents the time required for calculating the line weights referenced in Equation (1).

$t_{masks}$ represents the time required for creating the reconstruction and sinogram masks outlined in Equation (1).

$t_{alignment}$ represents the time required for three-dimensional data alignment, if necessary.

n represents the number of iterations to be conducted.

$t_{iteration}$ represents the time required for one iteration of the reconstruction.

In Equation (3), the values associated with pixel weights, line weights, masks, and alignment can be pre-calculated and saved to memory. The pixel and line weights are dependent on the physical setup of CT scan parameters, which will be consistent for mass inspected parts. Different settings can be pre-calculated in advance as well for flexibility. The prior knowledge data can be pre-aligned, image processed, and saved in memory. This reduces the overall computation time needed for reconstruction. Iteration computation time can be decreased by reducing the reconstruction volume through cropping with the iteration computation time represented in Equation (3) by $t_{iteration}$. In this case, cropping refers to the removal of empty air information from the projection and reconstruction space, reducing the size of the projection data and reconstruction volume. By identifying specific regions of interest (ROIs) in the reconstruction where there is empty space outside of the part's volume, cropping bounds can be applied to the projection data, prior knowledge data, sinogram and reconstruction mask data, and the relaxation matrix. These ROIs can be annotated from several key projection views or manually defined. Further time reductions can be accomplished by adjusting the convergence criterion, which is adjusted in n, a convergence criterion shown in FIG. 2 (see 228). Reducing iteration time can be accomplished through hardware graphics processing unit (GPU) scaling. The iteration time of the present invention is shown to be inversely proportional to the number of GPUs used, holding all other hardware specifications equal. Thus, while iterative reconstruction may require approximately three times more computational reconstruction time than FDK, this time can be reduced linearly with additional GPUs due to the parallelizable nature of the iterative process.

Figures 6A, 6B, 6C:
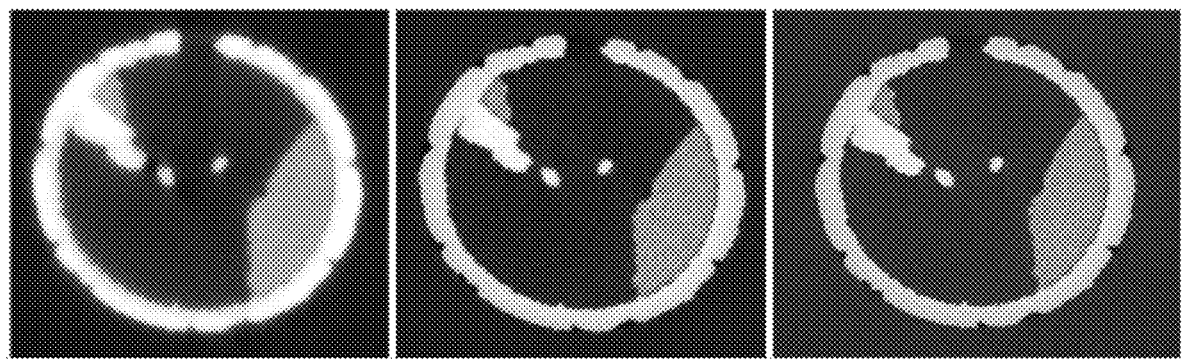
Figure 7:
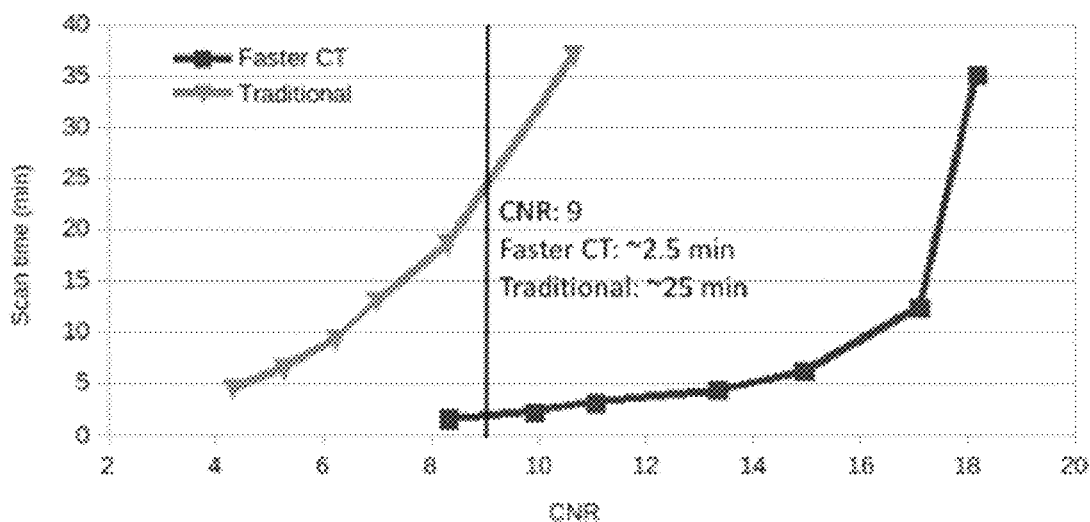
FIG. 7 is a graphical comparison of contrast-to-noise ratio (CNR) values for the method of the present invention and the FDK methodology across a range of scan times demonstrating that the present invention achieves similar values to FDK with a 90% reduction in scan time for the part scanned, which in this example, is an additively manufactured rook such as that depicted in FIGS. 6A-6C.

FIGS. 6A-6C are cross-sectional images of an additively manufactured rook reconstructed using three different techniques, wherein FIG. 6A is an image of a classical iterative reconstruction without prior knowledge data and 3× faster scan time; FIG. 6B is an image of CT reconstruction using prior knowledge data and 3× faster scan time; and FIG. 6C is an image of a traditional FDK reconstruction at full scan time. The present invention demonstrates dramatic improvement over a classical iterative reconstruction without prior knowledge data and is of similar quality to the traditional FDK method, but with a greatly reduced CT scan time. One study performed, analyzed the effect of scan time on the contrast-to-noise ratio (CNR) of a reconstruction, which is a standard metric used to measure the prominence of a reconstructed object to its background. The graph presented in FIG. 7 demonstrates that the methodology of the present invention achieves similar CNR values to FDK with a 90% reduction in scan time for the additively manufactured rook.

The present invention also provides cost-effective model-based probability of detection. This capability is important for the qualification of additively manufactured parts, where it is imperative to not only identify defects but also measure an associated level of confidence for each identified defect. The method of this invention has an advantage over the traditional FDK algorithm for this application because it is based on an iterative technique that allows access to and manipulation of data on a per-detector-pixel basis during reconstruction. In particular, this provides information about the number of X-rays passing through each voxel of the three-dimensional reconstruction and this information be leveraged to accurately identify defects and assign corresponding probabilities of detection.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A method for using computed tomography for non-destructive evaluation of a part by reconstructing a volume from X-ray projections gathered from a tomographic system using limited information, the method comprising:
    (a) collecting measured projection data from a tomographic system using system hardware information including geometric configuration and scanning parameters;
    (b) processing projection images and count data;
    (c) processing and aligning prior knowledge data;
    (d) generating a sinogram mask of the projection data from the prior knowledge data;
    (e) generating a reconstruction mask in three-dimensional volume grid space from the prior knowledge;
    (f) generating an initial three-dimensional relaxation matrix from the prior knowledge data;
    (g) cropping projection data, prior knowledge data, sinogram and reconstruction mask data, and relaxation matrix data based on part and scanning geometry for reconstruction computation speed improvement;
    (h) generating an estimate reconstruction based on the input masked prior knowledge data and populating a masked reconstruction space;
    (i) forward projecting the estimate reconstruction and calculating the difference between the measured projection data and the estimated projection data;
    (j) back projecting the differences over the reconstruction volume;
    (k) weighting the back projected differences with the relaxation matrix and then combining the information with the estimate reconstruction and updating the estimate reconstruction;
    (l) combining a set number of previous back projected differences to function as a heatmap for features not aligned or able to be aligned by the prior knowledge data;
    (m) updating the relaxation matrix as a function of an accelerating or decelerating parameter based on the current iteration of the process and the calculated heatmap;
    (n) repeating steps (i)-(m) until a convergence criterion is met;
    (o) post-processing the reconstruction results by applying a smaller reconstruction mask than that generated in step (e); and
    (p) outputting the reconstructed tomographic image.

2. The method of claim 1, where the prior knowledge data includes data derived from a more detailed scan of an idealized part that was optimized for quality over speed, thereby serving as a ground truth.

3. The method of claim 1, where the three-dimensional reconstruction mask is a binarized mask that can be either a convex hull mask or detailed to each segmented feature.

4. The method of claim 1, where the three-dimensional relaxation matrix is normalized based on reconstruction prior knowledge data attenuation values and seeded with an acceleration or deceleration factor.

5. The method of claim 1, where the estimation and difference back projection step is executed according to an SIRT-like iterative process.

6. The method of claim 1, wherein the weight of the back-projection matrix is combined with the relaxation matrix in a voxel-wise operation.

7. The method of claim 1, where the heatmap is used to differentiate specific part features not aligned by the alignment process, and wherein the heatmap masks and re-align the part features to increase the accuracy of the relaxation matrix and the difference update process.

8. The method of claim 1, where the post-process masking occurs in the reconstruction volume.

9. A method for using computed tomography for non-destructive evaluation of a part by reconstructing a volume from X-ray projections gathered from a tomographic system using limited information, the method comprising:
    (a) collecting measured projection data from a tomographic system using system hardware information including geometric configuration and scanning parameters;
    (b) processing projection images and count data based on part geometry information including dimensions and material composition;
    (c) processing and aligning prior knowledge data, wherein the prior knowledge data includes three-dimensional CAD data, other reconstruction data derived from the same part, and part geometry information including dimensions and material composition;
    (d) generating a sinogram mask of the projection data from the prior knowledge data;
    (e) generating a reconstruction mask in three-dimensional volume grid space from the prior knowledge;
    (f) generating a three-dimensional relaxation matrix from the prior knowledge data;
    (g) cropping projection data, prior knowledge data, sinogram and reconstruction mask data, and relaxation matrix data based on part and scanning geometry for reconstruction computation speed improvement;

(h) generating an estimate reconstruction based on the input masked prior knowledge data and populating a masked reconstruction space;

(i) forward projecting the estimate reconstruction and calculating the difference between the measured projection data and the estimated projection data;

(j) back-projecting the differences over the reconstruction volume according to an SIRT-like iterative process;

(k) weighting the back projected differences with the relaxation matrix and then combining the information with the estimate reconstruction, and updating the estimate reconstruction;

(l) combining a set number of previous back projected differences to function as a heatmap for features not aligned or able to be aligned by the prior knowledge data;

(m) updating the relaxation matrix as a function of an accelerating or decelerating parameter based on the current iteration of the process and the calculated heatmap;

(n) repeating steps (i)-(m) until a convergence criterion is met;

(o) post-processing the reconstruction results by applying a smaller reconstruction mask than that generated in step (e); and (p) outputting the reconstructed tomographic image.

10. The method of claim 9, where the prior knowledge data includes data derived from a more detailed scan of an idealized part that was optimized for quality over speed, thereby serving as a ground truth.

11. The method of claim 9, where the three-dimensional reconstruction mask is a binarized mask that can be either a convex hull mask or detailed to each segmented feature.

12. The method of claim 9, where the three-dimensional relaxation matrix is normalized based on reconstruction prior knowledge data attenuation values and seeded with an acceleration or deceleration factor.

13. The method of claim 9, wherein the weight of the back-projection matrix is combined with the relaxation matrix in a voxel-wise operation.

14. The method of claim 9, where the heatmap is used to differentiate specific part features not aligned by the alignment process, and wherein the heatmap masks and re-align the part features to increase the accuracy of the relaxation matrix and the difference update process.

15. The method of claim 9, where the post-process masking occurs in the reconstruction volume.

16. The method of claim 9, wherein the features not aligned or able to be aligned by the prior knowledge data include wires and movable components.

* * * * *